INVENTORS
GEORGE J. FLEGEL
WILLIAM L. ZOPFI

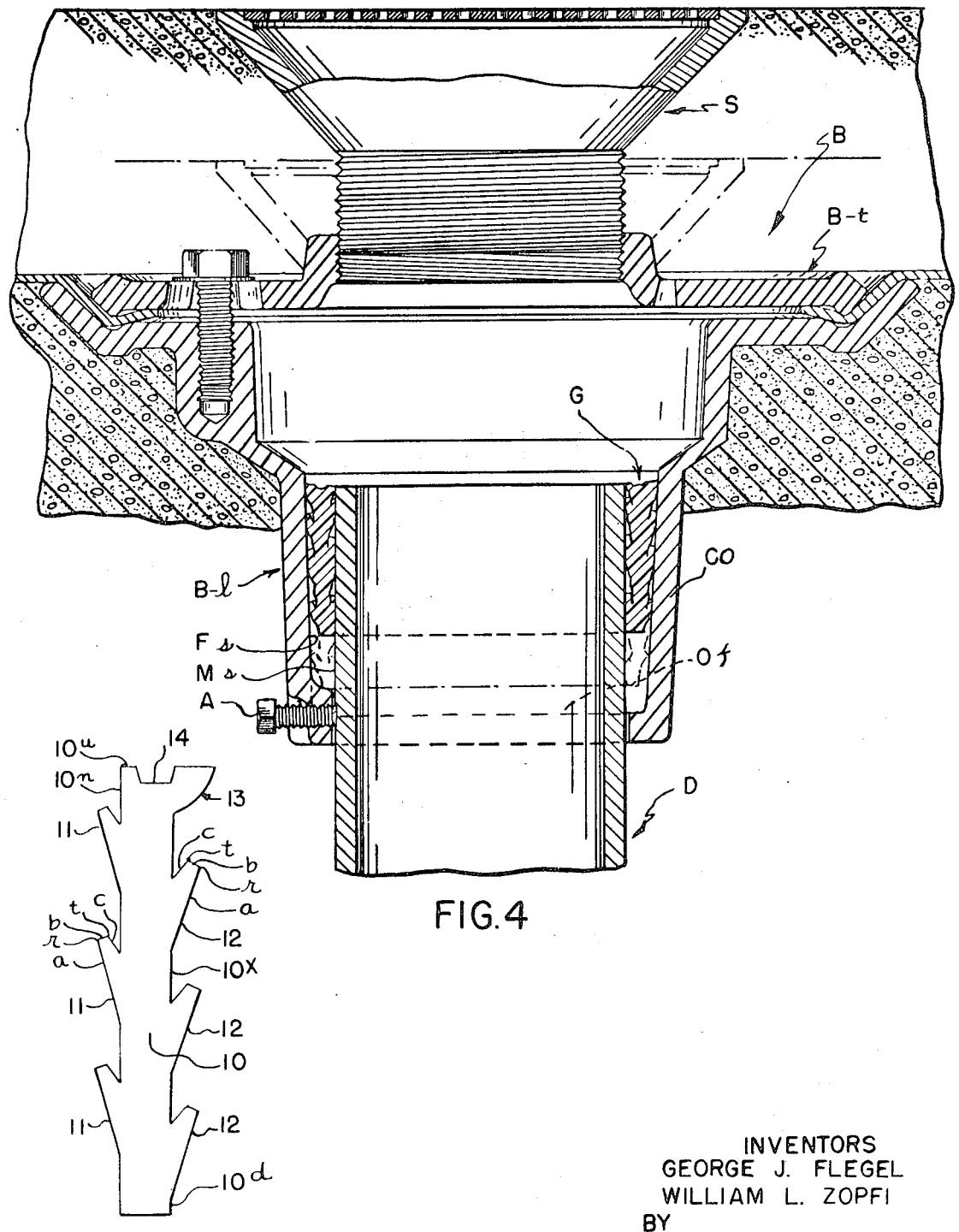

United States Patent Office 3,702,193
Patented Nov. 7, 1972

3,702,193
SELF-RETAINING AND SEALING JOINT GASKETING SLEEVE
George J. Flegel, Michigan City, Ind., and William L. Zopfi, Ferndale, Mich., assignors to Josam Manufacturing Co.
Continuation of abandoned application Ser. No. 863,791, Oct. 6, 1969. This application Feb. 22, 1971, Ser. No. 117,724
Int. Cl. F16j 9/00; F16l 19/00
U.S. Cl. 277—209                           15 Claims

ABSTRACT OF THE DISCLOSURE

An elastomeric seal collar or gasket sleeve insertable by axially applied force and self-retaining in sealing relation and position between coaxially disposed non-grooved, non-ribbed telescoped elements such as a caulked type body outlet of a drain and a pipe stub. A generally cylindrical annular body has an internal set and an external set of integral axially spaced similar circumferential fins, the internal set axially rearwardly offset from the external set. For the fins, sloping backwardly from the insertion leading end of the body, a particular form is described and the trailing end of the body is provided with an external arcuate sealing rim and a broad end face, grooved for driving tool engagement and to allow sealing compression for the rim.

---

This application is a continuation of application Ser. No. 863,791, filed Oct. 6, 1969, and now abandoned.

The present invention is hereinafter described as providing the seal, for example, for an internal caulk type floor drain sealed to a cast iron drain pipe stub end received therein, though applicable to other similar joints and especially joints subjected to similar fluid pressure application.

The invention has the advantageous object of eliminating much of the joint fabrication cost, especially the labor costs, and as well the hazards of handling molten lead in joint installations where oakum-lead caulking hitherto has been the usual practice or even been deemed imperative. While pursuing such objects, the invention advantageously avoids the fabrication costs of various proposals for non-threaded, non-leaded joints involving use of flexible seals held in compressed sealing relation between joined elements by follower or compression devices, or use of wedging components in conjunction with one or more sealing components. Another object is to provide a self-retaining gasket collar readily insertable between telescoped, round-section elements which achieves the self-holding sealing function without requiring grooving or ribbing formations in the sealed elements. A further object is to provide a sealing collar for the stated use, which further may be installed without need of special equipment or special tools other than hammer and a caulking type driving iron in cases where not hand insertable.

Other objects and advantages will appear from the following description and the drawings wherein:

FIG. 3A is an enlarged section; and

FIG. 4 is a vertical, generally axial, section of a floor drain installation showing a gasketing or seal sleeve embodying the present invention as used for joining the drain body to a drain pipe end stub.

Figure 2:
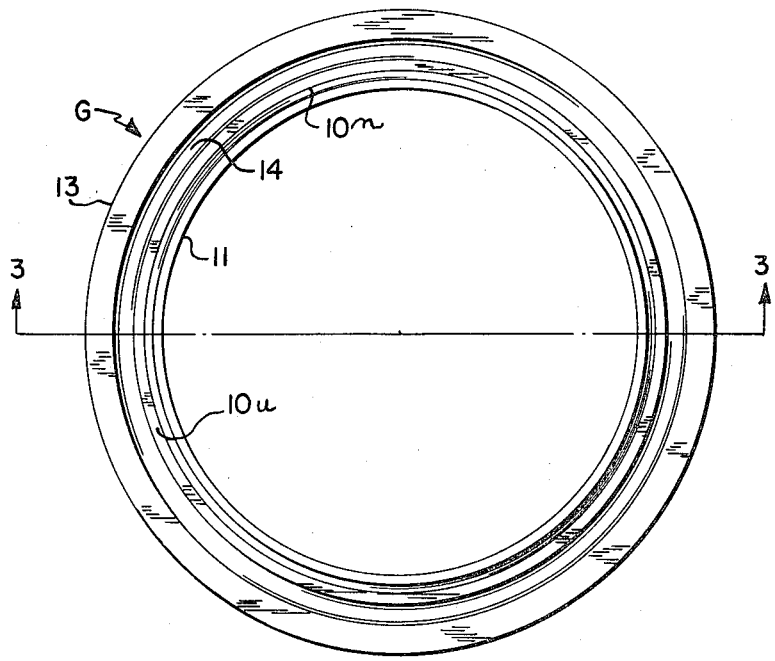
FIG. 2 is a top end view of FIG. 1.
Figure 1:
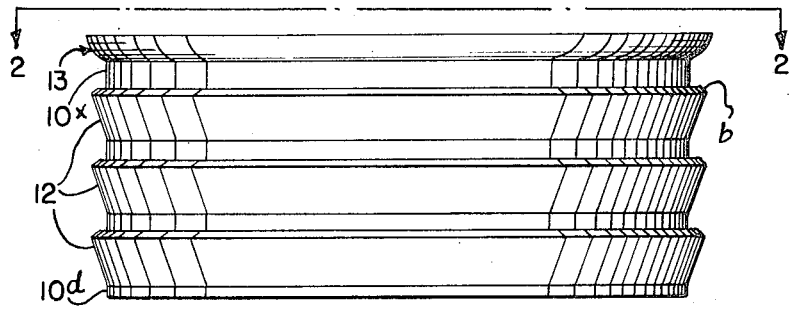
FIG. 1 is an elevational view of a gasket sleeve or sealing collar embodying the present invention.
Figure 3:
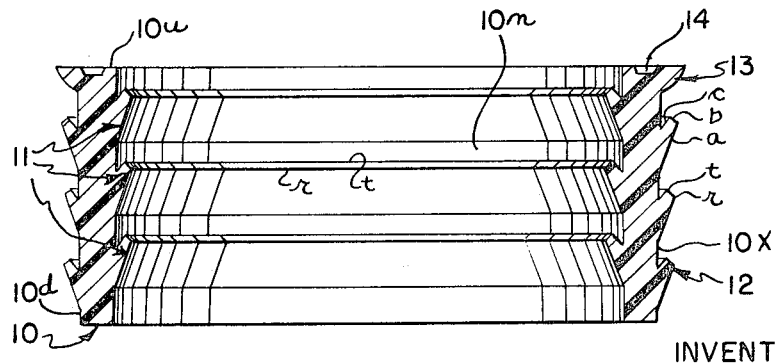
FIG. 3 is an axial longitudinal sectional view taken at the line 3—3 in FIG. 2.

In the drawings, a sealing collar or gasket sleeve G in accordance with the invention is shown in FIGS. 1–3A. As one example of environment in which the invention is advantageously used, in FIG. 4 there appears a known form of adjustable strainer-type floor drain comprised of a two-piece body assembly B including a lower main bowl-like body portion B–l and, as a bolted-on, flashing-clamping, body top portion, a reversible clamping plate B–t with a threaded central opening receiving the male threaded cylindrical part of the adjustable strainer S. The main body portion B–l includes a central bottom caulked type outlet CO in which an inserted vertical stub end of a drain line D is held in centered relation to the outlet formation interior surface by a plurality of preferably three equi-spaced set screws, as at A each threaded through spaced inward bosses formed in the inward lip Of at the bottom of the outlet formation.

The two telescoped elements to be sealed define a generally cylindrically annular recess receiving the sealing gasket sleeve or collar G; and neither the interior surface Fs of the socketed outlet formation as the external or female element, which surface diverges from cylindrical only by the taper necessary for casting draft, nor the cylindrical outside surface Ms of the pipe as the internal or male element has any beading, ribbing or grooving engaging with the seal element G.

The details of the sealing collar or gasket sleeve element G, which appears distorted in shape by its installation in FIG. 4, are to be gathered from FIGS. 1–3A, showing the sleeve in its free condition with respect to which it is best described.

The sealing collar or gasket sleeve G, is made by molding or other apt methods from a tough resilient elastomeric material water-proof and durable under weathering conditions, e.g., plasticized PVC or neoprene of 50 to 60, preferably about 60, Shore A durometer hardness; and comprises a generally hollow cylindrical body 10 provided with seats of three similarly shaped, circumferentially continuous internal fins 11 and external fins 12, substantially equi-spaced longitudinally on the sleeve body, and, at its top end, an external arcuate top sealing rim formation 13.

The gasket body at its bottom end 10d, its leading end upon insertion into a joint recess, has a short length free of any fin formation as a lead-in portion thinner or narrower than the radial gap at the mouth of the annular recess, thereby facilitating insertion. At the top or trailing end of the body, widened by the presence of the convexly bottom-edge-rounded external rim 13, the resultant flat wide end face 10u is provided with a sloped-walled, flat-bottomed, broad end groove 14, shallower than the axial length of rim 13 and circumferentially centered over the heaviest vertical section of the body. This groove affords a better engagement by an installation driving tool and, importantly, provides an open space or body section relieving recess allowing inward rim compression for sealing. The free length of the sleeve body is to be no greater than spacing from the top of the generally cylindrical internal surface of the outlet down to the local elevations of the set screw boss formations, or in a structure lacking these, to any inward shoulder as usually defines the caulking recess bottom in an outlet or the like.

With respect to the basic sleeve body form on which the fins may be thought as having base regions affixed, the inside surface 10n is cylindrical, while the roughly cylindrical outer surface 10x actually diverges somewhat from cylindrical, i.e., in the drawings from the vertical, upwardly and outwardly corresponding to the draft, typically 2°, required in the interior of the outlet formation for casting production. In other words, though the spacing of the inner and outer body surfaces (i.e. local body radial thickness) is less than that of the male and female element surfaces defining the seal-receiving annular recess, were a section image of the sleeve superimposed on the seal receiving section of the recess, the inside and outside body surfaces of the sealing collar G in free undistorted state would be parallel to the male and female surfaces respectively to be sealingly engaged by the fins.

It will be observed (see FIGS. 3 and 3A) that each fin has what may be termed a blunt, square-ended barb-like configuration, sloping rearwardly and outwardly from the leading end of the body, forming a re-entrant angle between the fin upper or inside surface and the gasket body. In the individual fins, the outside or lower fin surface $a$ slopes with a preferred angle of 20° to the vertical in a range of 18° to 30°, the end face $b$ is at a right angle to $a$, and the top or inner face $c$ slopes at a preferred 40° angle to the vertical; or defining the center line of the section of the fin as a line parallel to the fin side $a$ and bisecting end face $b$, the fin center line is at a preferred 20° to the inside body surface. The intersections of $a$ and $c$ with the body define what may be called the fin base.

Further the internal fins 11 are axially offset upwardly from the external fins 12, that is, rearwardly from the leading end. Hence the added base thickness due to a given fin is not totally coincident over its length with that of a fin on the other perimeter of the gasket. With the length $a$ considered the fin length, the axial offset, e.g., as represented by the spacing of the base bottom of an internal fin above the base bottom of the corresponding external fin, is about half (50%) the fin length, 30–60% being feasible.

In such blunt-ended fin shape, between the top edge $t$ and outer edge $r$, the flat end surface $b$ at 90° to side $a$ provides at $r$ an edge particularly apt for a sealing and self-retaining engagement even with cast elements having superficial imperfections or roughness. The thickness of the fin, increasing toward its base, provides strength without loss of the compressibility or deformability required in the fins as well as body and rim advantageously to accommodate expected variations from nominal sizes of the elements being sealed, i.e., variations (up to the accepted manufacturing tolerances) from the normal or design dimensions in the nominal sizes.

Though the top region is stiffened by the top width thickening due to the externally bottom rounded rim formation 13 and the presence of the topmost inner fin 11 spaced fairly close to but inward of the top end face, upon insertion, as the rim bottom encounters a gap wall, the rim is displaced upwardly and inwardly. This action displaces the top end of the body about the top inner fin in a somewhat pivoting fashion to enforce sealing contact of the body top inner edge against the pipe, even where the pipe has that minimum external diameter (i.e., of accepted manufacturing tolerances for the nominal pipe size) which may give a maximum recess mouth gap width larger than the rear end annular face width. On the other hand, with up to the maximum accepted positive tolerance of the pipe external diameter giving minimum gap, the groove and rim deflection allows diminution of thickness and sealing reception of the outer end in the gap. Thus both the offset location of the top inner fin between rim 13 and the top outer fin and the reduction of material from the body section at the groove 14 allow resiliently compressed reception of the gasket top end within the recess in a condition ensuring sealing to the opposed, spaced surfaces of the two telescoped elements. The fin spacing is such relative to fin length that the fin free ends can flex inwardly to the sleeve body without encountering another fin or rib 13.

With the like-shaped fins having the general proportioning to the sleeve body shown in the drawings, they are sized relative to the diameters of the female and male surfaces defining the recess in which it is to be received, so that the top circular edges $t$ of the external fins have respective diameters equal to the expected maximum inside diameters of the female surface regions to be contacted upon seal seating, the edges $t$ of the internal fins all having a diameter equal to the minimum expected outside diameter of the male surface. Accordingly, the edges $t$ and $r$ of the outside set progressively increase upwardly maintaining the same radial spacing from the body outside surface $10x$, with the edge diameter of the rim 13 being equal to that of the outer edge of the topmost fin 12; while the edges $r$ of the inner fin set have equal diameters as well as equal spacing from the body inside surface $10n$.

By way of specific example of a successful gasket (all values in inches) where for 3 inch cast iron soil pipe the top inside diameter of a drain outlet surface Fs is $4\%_{32}$ inches with a gasket length of $1\frac{3}{4}$ inches, outside top fin edge $t$ diameter of $4\%_{16}$, rim outside diameter of $4\%_{16}$, and axial spacing between fins of $\frac{1}{2}$, the fins have a $\frac{1}{16}$ width for surface $b$, lengths $1\frac{1}{32}$ and $\frac{3}{8}$ for the surfaces $a$ of the inside and outside sets, spacings from the flat bottom body end for the first outside and inside fin base bottoms of $\frac{1}{16}$ and $\frac{1}{4}$ respectively and for the edges $t$ of the first bottom outside and inside fins, of $\frac{7}{16}$ and $\frac{19}{32}$; while the groove 14 has a $\frac{1}{16}$ depth, $\frac{1}{8}$ bottom and $\frac{5}{32}$ top width, the rim 13 section a vertical thickness of $\frac{5}{32}$ and $\frac{1}{4}$ radius curvature, the outside body diameters at the bottom and beneath rim 13, $3^{61}\!/_{64}$ and $4\%_{64}$. For standard weight 3 inch pipe, the gasket body inside diameter is $3^{21}\!/_{64}$, resulting in a bottom and top body thicknesses of $\frac{5}{16}$ and about $\frac{3}{8}$ respectively; with the diameter of the inside fin edges $t$ $3\%_{32}$. For extra heavy 3 inch pipe, body inside diameter is $3^{17}\!/_{32}$, resulting in bottom and top body thicknesses of about $\frac{7}{32}$ and $\frac{9}{32}$ respectively; with a diameter of $3^{13}\!/_{32}$ for the edges $t$ of the inside fins.

In gaskets suitable for drain outlets sealed to 2 inch and 4 inch pipe of both weights, with the hub-like outlets having respectively top inside diameters of $3\%_{32}$ and $5\frac{1}{4}$, there are useable the same fin cross-section, the same cross-sections for goove 14 and for rim 13, and the same lead-in end spacings of the bottom fins as above described; with the gasket lengths respectively $1\frac{1}{2}$ and $2\frac{1}{4}$, the axial spacing in the sets about $\frac{7}{16}$ and $\frac{11}{16}$, and the rim outside diameters $3\%_{16}$ and $5\%_{16}$. For the 2 inch size, the body bottom and top outside diameters, and diameters of bottom and top fin edges $t$, $2^{53}\!/_{64}$, $2^{61}\!/_{64}$, and 3 and $3\frac{1}{16}$; and for the 4 inch size, $4^{61}\!/_{64}$, $5\%_{32}$, $5\%_{64}$ and $5^{13}\!/_{64}$. On the body inside and inner fin top edge $t$, the respective diameters were: for 2 inch standard, $2^{21}\!/_{64}$ and $2\%_{32}$; for 2 inch extra heavy, $2^{13}\!/_{32}$ and $2\%_{32}$; for 4 inch standard, $4^{21}\!/_{64}$ and $4\%_{32}$; and for 4 inch extra heavy weight $4^{17}\!/_{32}$ and $4^{13}\!/_{32}$; the corresponding body section bottom thicknesses being $\frac{1}{4}$, $\frac{7}{32}$; $\frac{5}{16}$, $\frac{7}{32}$. Since the appearance of the gaskets for the two pipe weights in a given size is so similar, convenient color code distinction is provided by painting the top end face with appropriate colors.

The sealing sleeve or gasket G is self-retaining in position in the gap or caulking recess defined between, and in sealed relation between, the pipe end stub and the surrounding socketed outlet wall portion. Generally with cast iron soil pipe and castings, manufactured by good modern practice, three ribs in each set, each tapering in cross-section as shown and herein described, appear sufficient to obtain an excellent self-retention in a well-sealed joint. The internal surface of the circumferentially enclosing wall portion of the defined recess is substantially (i.e., apart from draft provided in a cast drain body) cylindrical as shown, there being no necessity of grooving therein, nor for beading on the pipe end.

The comparatively thick body portion of the gasket promotes the more direct propagation of axial forces from the top end through to the leading bottom end of the resilient material as it is being pushed or driven into place, despite the advancement-retraining frictional forces developed with the adjacent metal surfaces over the extensive circumferential areas of the respective rearwardly flexed fins. The broad resilient circumferential areas and relief behind each fin ensure, over circles extending circumferentially around the body at several respective levels, sealing accommodation of the seal fin surfaces to the metal lying in contact therewith despite cast metal roughness and also self-retention engagement by the fins; these functions seemingly furthered by torsional couples or forces within the body across the offsets.

For commercial acceptability, the gasket G appropriately gives adaptability not only to the casting draft, resulting in a slightly upwardly increasing internal diameter for wall of the female elements, but also to variations of male and female joined members from their nominal dimensions, the manufacturing tolerances on the diameters of the sealed surfaces; particularly where cast iron soil pipe is involved, to the industry-established tolerances for the outside end diameter of the cast iron soil pipe of the weight for which the gasket is intended, and for the inside diameter of a socketed female structure.

In this environment, after roughing-in procedures for appropriately securing the drain body in the environment, with the centered relation established by set screws A, in accordance with usual building practices before even the rough pour for the concrete floor slab and with plate B–t removed, the gasket G, with a suitable lubricant such as a soap solution applied to its finned surfaces, may be installed by manually starting its front or bottom end into the annular gap or recess between the coaxially telescoped pipe stub D and drain outlet formation CO, and then advancing the gasket into final position; by pressure applied to its top or rear end either solely manually or finally, if needed, by hammer and driving iron working around the top end groove 14. In the use illustrated, the seal gasket is preferably set or driven flush with the pipe stub end, as shown, to avoid forming a debris catching trough; and, though end clearance is shown for the seal bottom, it may be driven as far as contact with the inward formations of the outlet formation bottom, as indicated by the dashed lines, if required under certain installation conditions.

Once driven into position, the frictional and compressive resilient forces developed and in conjunction therewith the fin formations not only render the gasket self-retaining as well as providing the requisite sealing function, but further will permit a considerable degree of repositioning of the drain body without loss of seal, before final concrete pour, in the event, not unusual in construction operations, that there has been accidental displacement of the elements from proper position.

In view of the extensive use of drains and cast iron soil pipe in drainage systems, particularly floor and roof drains in buildings, the invention has been described in terms of drain to cast iron pipe sealing, though such gaskets are applicable where a like connection is to be made between analogous elements of other materials, such as glass, tile, rigid plastic, copper.

What is claimed is:

1. A gasket collar adapted for self-retention as a seal axially insertable in the annular recess formed between the external surface of a first male portion and the coaxial internal surface of a receiving second female portion of respective fluid conducting elements, said surfaces substantially cylindrical, said collar comprising as a structure integrally fabricated of a resilient elastomeric material:
   a sleeve-like body portion
      having a radial thickness smaller than the annular recess width and a length no longer than the unobstructed length of said recess;
   a circumferentially continuous external rim at the rear end of said collar,
   the rear end face of the body having a substantially continuous circumferential groove
      providing a driving tool engagement formation and a body section relieving recess;
   a first set of like rearwardly sloping external circumferential fins,
      axially spaced on the body portion from each other, from the front body end, and from said rim,
   a second set comprising the same number of axially spaced, like internal rearwardly sloping circumferential fins,
      the fins of the second set axially offset in position from those of the first set
      with the rearmost internal fin spaced axially inward of said rim;
   at least one foremost fin spaced from the inner body end to afford a seal collar front end of section narrower than the recess gap to facilitate starting insertion in the recess;
   said fins in each set substantially identical in cross-section and each defined by
      a longer forward face at a first angle to the adjacent body surface,
      a shorter rear face at a second larger angle to the last said surface, and
      a narrow tip face at a blunt angle to the forward face;
      said forward face and tip face defining an outer circular fin edge.

2. A gasket as described in claim 1 wherein:
said rear face and narrow face of each fin define a rear circular fin edge;
the diameter of the rear circular edges of the internal fins is equal to a minimum expected diameter of the external surface of a said male portion; and
the diameter of each of the rear circular edges of the external fins is respectively equal to the maximum expected diameter of the internal surface of the said female portion intended to be sealingly contacted thereby;
said blunt angle approximately a right angle.

3. A gasket as described in claim 1 with
said first angle in a range of from about 18° to about 30°, and the fins of said first set at least three in number.

4. A gasket as described in claim 2, wherein
the external edge diameter of said rim portion is equal to the diameter of the outer circular edge of the adjacent external fin.

5. A gasket as described in claim 1, wherein
the cross-sectional shape of the internal fins is substantially identical with that of the external fins.

6. A gasket as described in claim 5 wherein
the axial offset of the fins is from 30 to 60% of the fin length.

7. A gasket collar as described in claim 1 wherein
said material has a Shore A durometer hardness of about 50 to 60.

8. A gasket collar as described in claim 1 wherein:
said rim forms with the adjacent end face of the body portion a continuous wide annular rear end face;
said rim having a convex forward external surface extending substantially from the outer circumference of said body to said rear end face.

9. A gasket collar as described in claim 8 wherein
said rear end face has an annular width greater than that of the mouth gap of said recess, as defined with a said male portion having the normal fabrication external diameter for its nominal size.

10. A gasket collar as described in claim 9 wherein
said groove has a flat bottom and is shallower than the axial length of said rim.

11. A gasket collar as described in claim 1 wherein
the spacings of the fins are such that each fin may be flexed inwardly against said body.

12. A gasket collar as described in claim 8, wherein
said second angle is about 40°.

13. A gasket collar as described in claim 1 wherein:
the cross-sectional shape of the internal fins is substantially identical with that of the external fins and the spacings of the fins are such that each fin may be flexed inwardly against said body;

the diameter of the rear circular edges of the internal fins is equal to a minimum expected diameter of the external surface of a said male portion;

the diameter of the rear circular edges of the external fins is for each respectively equal to the maximum expected diameter of the internal surface of the said female portion expected to be sealingly contacted thereby;

the external edge diameter of said rim portion is equal to the diameter of the outer circular edge of the adjacent external fin;

said rim forms with the adjacent end face of the body portion a continuous wide annular rear end face of an annular width greater than that of the mouth gap of said recess, as defined with a said male portion having the normal fabrication external diameter for its nominal size;

said rim having a convex forward external surface extending substantially from the outer circumference of said body to said rear end face; and said groove has a flat bottom and is shallower than the axial length of said rim.

14. A gasket collar as described in claim 13 wherein:
the axial offset of the fins is from 30 to 60% of the fin length;
said first and second angles are about 20° and 40° respectively; and
said material has a Shore A durometer hardness of about 50 to 60.

15. A gasket collar adapted for self-retention as a seal axially insertable in the annular recess formed between the external surface of a first male portion and the coaxial internal surface of a receiving second female portion of respective fluid conducting elements, said surfaces substantially cylindrical, said collar comprising as a structure integrally fabricated of a resilient elastomeric material:

a sleeve-like body portion
having a radial thickness smaller than the annular recess width and a length no longer than the unobstructed length of said recess;

the rear end face of the body having a substantially continuous circumferential broad shallow groove,
said groove rimmed by a circumferentially continuous external projection forming an external flexible circumferential fin at the rear end of said body and having a rearwardly flaring forward surface,
said groove providing a driving tool engagement formation and a body section relieving recess;

at least two further flexible external circumferential fins axially spaced on the body portion from each other,
said further fins each having a forward surface including a rearwardly outwardly flaring circumferential area; and a set of at least three axially spaced, internal rearwardly inwardly tapering circumferential fins,
comprising at least two fins axially offset in position rearwardly from respective foremost fins of the first set and a rearmost internal fin beginning its taper at a location axially forward of the rimmed groove.

References Cited
UNITED STATES PATENTS 2,896,974  7/1959  Bush _____ 277—208 X
3,165,324  1/1965  Zopfi _____ 277—209

FOREIGN PATENTS 61,978  1/1940  Norway _____ 277—207 A

SAMUEL B. ROTHBERG, Primary Examiner

U.S. Cl. X.R.

277—DIG. 2